(12) United States Patent
Handa et al.

(10) Patent No.: US 7,133,956 B2
(45) Date of Patent: Nov. 7, 2006

(54) ELECTRONIC DEVICE WITH SERIAL ATA INTERFACE AND SIGNAL AMPLITUDE ADJUSTING METHOD

(75) Inventors: Takuya Handa, Ome (JP); Fubito Igari, Hamura (JP); Akihiro Watanabe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 213 days.

(21) Appl. No.: 10/912,530

(22) Filed: Aug. 4, 2004

(65) Prior Publication Data

US 2005/0066203 A1 Mar. 24, 2005

(30) Foreign Application Priority Data

Aug. 5, 2003 (JP) .............................. 2003-286799

(51) Int. Cl.
G06F 13/14 (2006.01)
G06F 1/26 (2006.01)
H03K 17/16 (2006.01)

(52) U.S. Cl. ..................... 710/305; 713/300; 326/21

(58) Field of Classification Search ................ 710/305; 313/17; 326/21; 324/173; 713/300; 375/257
See application file for complete search history.

(56) References Cited

U.S. PATENT DOCUMENTS

| 3,786,354 A | * | 1/1974 | Lasky ......................... 324/173 |
| 4,413,240 A | * | 11/1983 | Dyke .......................... 333/17.1 |
| 5,838,726 A | * | 11/1998 | Nemoto et al. ............. 375/257 |
| 2005/0024083 A1 | * | 2/2005 | Kitamura et al. ............. 326/21 |

FOREIGN PATENT DOCUMENTS

JP  2000-341177  12/2000

\* cited by examiner

*Primary Examiner*—Rehana Perveen
*Assistant Examiner*—Jeremy S. Cerullo
(74) *Attorney, Agent, or Firm*—Foley & Lardner LLP (57) ABSTRACT

The CPU of an electronic device generates a parameter for determining the amplitude of a serial data signal when it is output from an output device to a serial ATA bus. The parameter indicates a value that is needed to make the amplitude of the received serial data signal fall within a range, stipulated in serial ATA interface standards, when another electronic device receives the serial data signal. The parameter is generated in accordance with the cable length of the serial ATA bus designated by a cable length designation unit. The other electronic device is connected to the serial ATA bus.

25 Claims, 4 Drawing Sheets

| CABLE LENGTH | JUMPER 121A | JUMPER 121B |
|---|---|---|
| 10cm | OPEN | OPEN |
| 30cm | OPEN | SHORTED |
| 60cm | SHORTED | OPEN |

FIG. 3

| GAIN (CABLE LENGTH) | JUMPER 121A | JUMPER 121B |
|---|---|---|
| G10 (10cm) | OPEN | OPEN |
| G30 (30cm) | OPEN | SHORTED |
| G60 (60cm) | SHORTED | OPEN |

ELECTRONIC DEVICE WITH SERIAL ATA INTERFACE AND SIGNAL AMPLITUDE ADJUSTING METHOD

CROSS-REFERENCE TO RELATED APPLICATIONS

This application is based upon and claims the benefit of priority from prior Japanese Patent Application No. 2003-286799, filed Aug. 5, 2003, the entire contents of which are incorporated herein by reference.

BACKGROUND OF THE INVENTION

1. Field of the Invention

The present invention relates to an electronic device for serially transferring data using a serial ATA (ATA attachment) interface. More particularly, it relates to an electronic device and signal amplitude automatic adjustment method utilizing a serial ATA interface suitable for automatically adjusting the amplitude of a serial data signal, output to a serial ATA bus, in light of the signal attenuation of the serial ATA bus.

2. Description of the Related Art

At present, standards for serial ATA interfaces as a new type of interface for use in disk drives are now being worked out. Serial ATA interfaces are used as an interface between a peripheral device, represented by a magnetic disk drive, and a host (host system) represented by a personal computer. In this point, serial ATA interfaces are similar to conventional ATA interfaces (i.e., parallel ATA interfaces).

A peripheral device with a serial ATA interface, such as a magnetic disk drive (hereinafter referred to as an "HDD"), is connected to a host by a serial bus. In such an HDD, to secure compatibility with an ATA interface, it is necessary to convert an ATA interface into a serial ATA interface, and convert a serial ATA interface into an ATA interface. Such interface conversion is performed by, for example, an LSI (bridge LSI) called a serial ATA bridge.

In the serial ATA interface standards, three layers of different functions, i.e., a physical layer, link layer and transport layer, are defined. The physical layer has a function for executing high-rate serial data transmission and reception. The physical layer interprets received data, and transmits the data to the link layer in accordance with an interpretation result. The physical layer also outputs a serial data signal to the link layer in response to a request therefrom. The link layer supplies the physical layer with a request to output a signal. The link layer also supplies the transport layer with the data transmitted from the physical layer. The transport layer performs conversion for operations based on the ATA standards. Assuming that the above-mentioned bridge LSI is used in an HDD, the role of the transport layer corresponds to the role of the ATA signal output unit of a conventional host that utilizes ATA connection. The bridge LSI is connected to the disk controller (HDC) of the HDD via an ATA bus (or a bus compliant with the ATA bus) based on the ATA interface standards. Accordingly, in the connection between the bridge LSI and HDC of the HDD, operations equivalent to those stipulated in the ATA interface standards or compatible with the standards are performed. In this case, the portion of the HDD excluding the bridge LSI (hereinafter referred to as a "main HDD unit") regards the bridge LSI as an apparatus (host) for issuing a command to the main HDD unit. Accordingly, the main HDD unit operates in the same manner as a conventional HDD utilizing ATA connection. Thus, the serial ATA interface is compatible with the ATA standards concerning protocols such as logical commands. However, a data signal (parallel data signal) processed by a parallel ATA interface must be converted into a serial data signal.

The serial ATA interface standards stipulate that a cable with a length of 1 m, at maximum, can be used for data transfer using a serial ATA interface. Further, the serial ATA interface standards sets the maximum and minimum amplitudes of a signal at the receive side to 600 mV and 325 mV, respectively. Actually, however, when apparatuses are connected using a serial ATA interface, attenuation in a data signal due to the cable (serial ATA bus) used must be considered. That is, a data signal output from a transmitter that uses a serial ATA interface attenuates while passing through the cable (serial ATA bus). As a result, the amplitude of the data signal is inevitably reduced when it is received by a receiver. Thus, when the amplitude of a signal output from a transmitter is determined so that at the receive side, it falls within the range stipulated in the serial ATA interface standards, attenuation due to the cable must be considered.

Assume here that the amplitude of a signal output from a transmitter is set in light of maximum signal attenuation that occurs when a cable of 1 m is connected between the transmitter and receiver, so that at the receive side, it falls within the standard range. Assume also that the transmitter is actually connected to the receiver by a very short cable (serial ATA bus). In this case, the attenuation of a signal due to the cable is smaller than the assumed maximum attenuation, therefore the actual signal amplitude at the receiver is higher than in the maximum signal attenuation case. As a result, the amplitude of a signal received may well be higher than the reference (standard) value, which may adversely influences the receiver. On the other hand, if a long cable is used where the amplitude of a signal output from a transmitter is set in light of a short cable, the amplitude of a signal received may be lower than the reference value.

The above-described case where an assumed cable length differs from an actual one can occur when the apparatus to which a serial ATA interface is connected is, for example, a small-size HDD (magnetic disk drive). This is for the following reasons: Firstly, a small-size HDD can be used not only as a storage for a desktop computer, like a large-size HDD, but also as a storage for a portable electronic device, such as a notebook-type personal computer. Thus, a small-size HDD can be used in various occasions. If an HDD is used as a storage for a portable electronic device, the space for the HDD is generally small. In this case, the degree of freedom of selecting the length of a cable connected between the HDD and electronic device is low. For example, if a 2.5-inch HDD is used as a storage for a notebook-type personal computer, the HDD is directly connected to the computer without a cable. Thus, in the case of a small HDD, it is necessary to change the length of the cable used, depending upon the situation. In other words, the cable length cannot be set in advance. This is an example of the above-mentioned case where the assumed cable length differs from the actual one.

Jpn. Pat. Appln. KOKAI Publication No. 2000-341177 (hereinafter referred to as a "prior art document") discloses an image signal transmission apparatus that allows a user to adjust the amplitude of a signal in accordance with the length of a cable. In this apparatus, when the user activates application software for setting a cable length, a selection dialog box for allowing the user to designate a cable length is displayed. If the user selects a desired cable length from the selection dialog box, an amplitude control command corresponding to the selected cable length is issued. Upon receiving this command, a graphics controller outputs an amplitude control signal corresponding to the command. In response to the amplitude control signal, an amplitude control circuit at a transmit side controls the amplitude of an image signal output from the transmit side to the cable.

As described above, in the image signal transmission apparatus described in the prior art document, the amplitude of an image signal (output signal) output from the transmit side to the cable can be adjusted in accordance with a cable length designated by a user. However, the prior art document merely describes that the amplitude of an image signal is adjusted to a lower one or higher one of two values, depending upon whether 3 m or 10 m is selected as the cable length. In other words, the prior art document does not specify the two values, and does not describe how the adjustment is performed in accordance with the cable length. Accordingly, even if the image signal amplitude adjustment technique (prior technique) described in the prior art document is employed in a system in which electronic devices are connected via serial ATA interfaces, it is still difficult to make the amplitude of an input signal (received signal) at a receive side fall within the range stipulated in the serial ATA interface standards.

BRIEF SUMMARY OF THE INVENTION

In accordance with embodiments of the invention, there is provided an electronic device with a serial ATA interface having a signal output device which outputs a serial data signal to a serial ATA bus which connects the electronic device to another electronic device. The another electronic device including another serial ATA interface; a cable length designation device for designating a cable length of the serial ATA bus in accordance with a user operation; an amplitude parameter generation device for generating, in accordance with the cable length designated by the cable length designation device, an amplitude parameter for determining an amplitude of the serial data signal when the signal output device outputs the serial data signal, the amplitude determined by the amplitude parameter enabling the amplitude of the serial data signal to fall within a range, stipulated in serial ATA interface standards, when the another electronic device receives the serial data signal. The another electronic device also includes a signal amplitude adjusting device for adjusting the serial data signal to the amplitude determined by the amplitude parameter, when the signal output device outputs the serial data signal.

In accordance with other embodiments of the invention, there is provided a system comprising a first electronic device with a serial ATA interface; a second electronic device with a serial ATA interface; and a serial ATA bus connecting the first electronic device to the second electronic device. The first electronic device includes a first signal output unit for outputting a first serial data signal to the serial ATA bus; and a first signal amplitude adjusting device for adjusting the first signal output unit to make the first serial data signal have an amplitude determined by a received amplitude parameter when the first signal output unit outputs the first serial data signal. The second electronic device includes a second signal output unit for outputting a second serial data signal to the serial ATA bus; a cable length designation device for designating a cable length of the serial ATA bus in accordance with a user operation; an amplitude parameter generation device for generating, in accordance with the cable length designated by the cable length designation device, an amplitude parameter for determining an amplitude of the second serial data signal when the second signal output unit outputs the second serial data signal, the amplitude determined by the amplitude parameter enabling the amplitude of the second serial data signal to fall within a range, stipulated in serial ATA interface standards, when the first electronic device receives the second serial data signal output from the second signal output unit; a second signal amplitude adjusting device for adjusting the second signal output unit to make the second serial data signal have an amplitude determined by the amplitude parameter when the second signal output unit outputs the second serial data signal; and the second signal output unit transferring a particular command to the first electronic device via the serial ATA bus, the particular command including the amplitude parameter generated by the amplitude parameter generation device, the particular command being used to supply the amplitude parameter included therein to the first signal amplitude adjusting device of the first electronic device as the received amplitude parameter.

In accordance with yet further embodiments of the invention, there is provided a method of adjusting an amplitude of a serial data signal, employed in a system in which a first electronic device with a serial ATA interface is connected to a second electronic device with a serial ATA interface by a serial ATA bus. The first electronic device includes an signal output device for outputting a serial data signal to the serial ATA bus, and a signal amplitude adjusting device for adjusting an amplitude of the serial data signal in accordance with an amplitude parameter when the signal output device outputs the serial data signal. The method comprises generating, in accordance with a cable length designated by a user operation, an amplitude parameter for determining the amplitude of the serial data signal when the signal output device outputs the serial data signal, the amplitude determined by the amplitude parameter enabling the amplitude of the serial data signal to fall within a range, stipulated in serial ATA interface standards, when the second electronic device receives the serial data signal; and setting the generated amplitude parameter in the signal amplitude adjusting device.

In accordance with yet further embodiments of the invention there is provided an electronic device with a serial ATA interface, having a signal output device which includes a processing unit for converting serial data to parallel data and parallel data to serial data, the signal output device outputting a serial data signal to a serial ATA bus which connects the electronic device to another electronic device, the another electronic device including another serial ATA interface; a cable length designation device for designating a parameter representative of a cable length of the serial ATA bus in accordance with a user operation; and a device, responsive to the designated parameter representative of cable length, for adjusting an amplitude of the serial data signal transmitted from the outputting device such that the amplitude of the serial data signal received by the another electronic device falls within a range, stipulated by a serial ATA interface standard.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
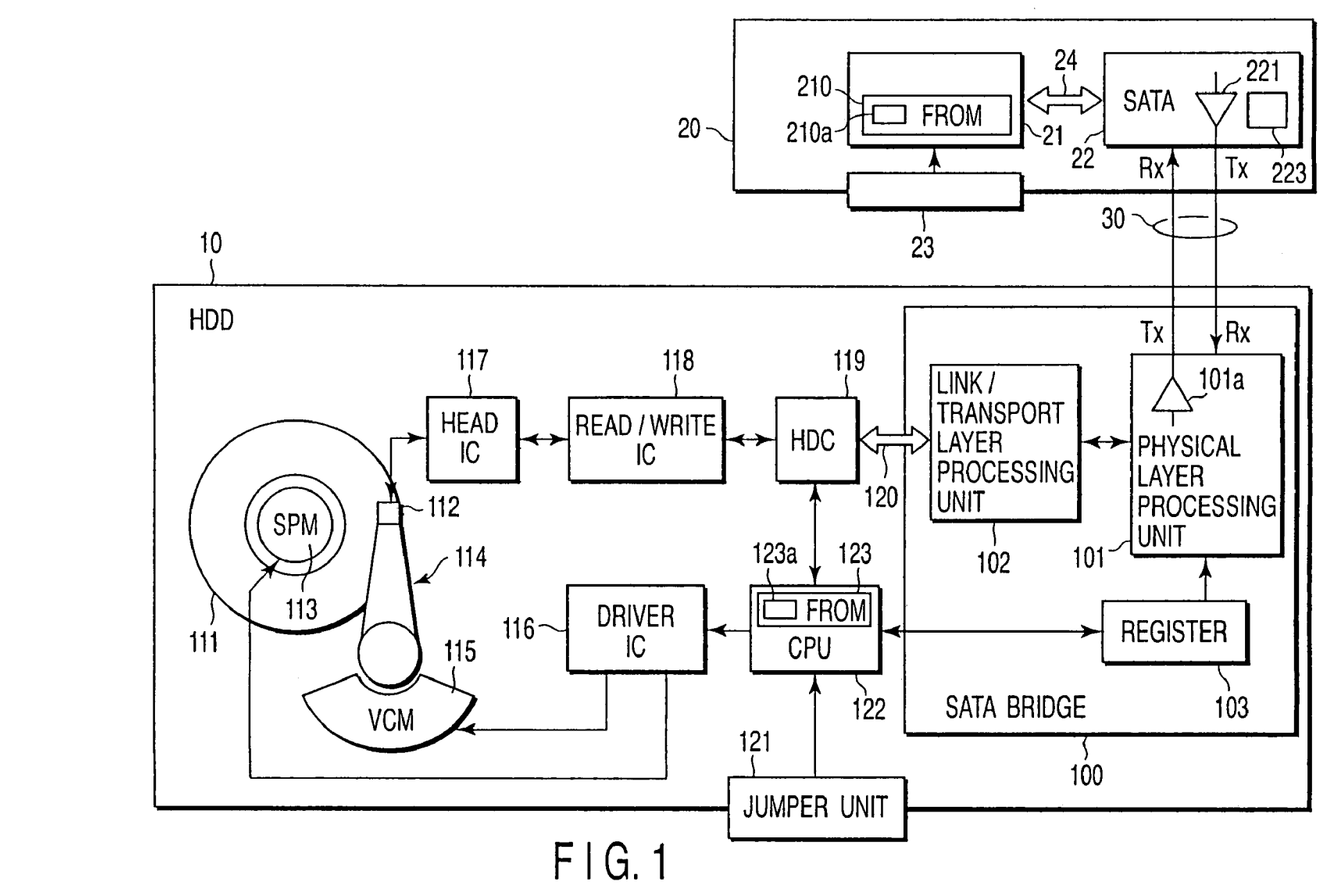
FIG. 1 is a block diagram illustrating the configuration of a system with a magnetic disk drive (HDD) according to an embodiment of the invention.

A system equipped with a magnetic disk drive having a serial ATA (SATA) interface, according to an embodiment of the invention, will be described in detail with reference to the accompanying drawings. FIG. 1 is a block diagram illustrating the configuration of the system with the magnetic hard disk drive (HDD) according to the embodiment of the invention. As shown, an HDD 10 comprises a serial ATA (SATA) bridge 100, as well as a main HDD unit (everything except the bridge 100) having a configuration corresponding to that of a conventional HDD that performs parallel data transmission using an ATA interface. The SATA bridge 100 is formed of, for example, a one-chip large-scale integrated circuit (LSI). The SATA bridge (bridge LSI) 100 serves as an SATA interface control circuit for performing interface conversion between an ATA interface and SATA interface.

The SATA bridge 100 is connected to a host 20 via a serial ATA (SATA) bus 30. The host 20 is an electronic device that utilizes the HDD 10 as storage. The host 20 is, for example, a personal computer. The length of the SATA bus 30 depends upon the way of use of the HDD 10. In other words, the length of the SATA bus 30 varies depending upon whether the host 20 is a notebook personal computer or desktop personal computer. The SATA bus 30 can be formed of a cable (electric wire) or wiring pattern. The wiring pattern may be formed on, for example, the printed circuit board of the host 20. In this embodiment, the length of the SATA bus 30 is called a cable length, regardless of whether the SATA bus 30 is formed of a cable or wiring pattern. The SATA bridge 100 is also connected to an HDC 119, described later, contained in the HDD 10, via an ATA bus 120 that conforms to the ATA interface standards.

The SATA bridge 100 comprises a physical layer processing unit 101, link/transport layer processing unit 102 and register 103. The physical layer processing unit 101 executes high-rate serial data transfer (transmission/reception) via the SATA bus 30. At this time, the data transfer rate is 1.5 Gbps (gigabits per second). The physical layer processing unit 101 interprets data received from the SATA bus 30, and transmits the data to the link/transport layer processing unit 102 in accordance with the interpretation result. Further, the physical layer processing unit 101 transmits a serial data signal in response to a request from the link/transport layer processing unit 102. The physical layer processing unit 101 includes an output amplifier 101a. The output amplifier 101a amplifies a serial data signal supplied from the link/transport layer processing unit 102, and outputs the resultant signal to the SATA bus 30. The gain of the output amplifier 101a is adjustable from by the user (manufacturer) using, for example, the jumper unit. The link/transport layer processing unit 102 includes a link layer processing unit and transport layer processing unit, which are not shown. The respective link layer processing unit supplies the physical layer processing unit 101 with a request to output a signal, in response to a request from the transport layer processing unit. Further, the link layer processing unit supplies the transport layer processing unit with data transmitted from the physical layer processing unit 101. The transport layer processing unit performs interface conversion between the ATA interface and SATA interface. The ATA and SATA interfaces are implemented by the link/transport layer processing unit 102 and the physical layer processing unit 101. The register 103 is used to hold, for example, gain values. Each gain value is an amplitude parameter for determining the amplitude (output level) of a serial data signal output from the output amplifier 101a. The gain of the output amplifier 101a is set as a gain value in the register 103.

The configuration of the HDD 10 except for the SATA bridge 100 will be described. The HDD 10 has a disk 111 as a recording medium. At least one surface of the disk 111 is a recording surface on which data is magnetically recorded. A head (magnetic head) 112 opposes the at least one recording surface of the disk 111. In the example of FIG. 1, the HDD 10 includes only one head 112 for facilitating the explanation. However, in general, both surfaces of the disk 111 serve as recording surfaces, which respective opposing heads. Further, in the example of FIG. 1, the HDD 10 includes a single disk 111. However, it may include a plurality of disks 111 stacked on each other.

The disk 111 is spun at high speed by a spindle motor (SPM) 113. The head 112 is used to read and write data from and to the disk 111. The head 112 is attached to the tip of an actuator 114. The actuator 114 has a voice coil motor (VCM) 115. The actuator 114 is driven by the VCM 115, thereby radially moving the head 112 over the disk 111. As a result, the head 112 is positioned on a target track. The SPM 113 and VCM 115 are powered by respective driving currents (SPM current and VCM current) supplied from a motor driver IC 116. The motor driver IC 116 supplies the SPM 113 with an SPM current designated by a CPU 122, and supplies the VCM 115 with a VCM current designated by the CPU 122.

The head 112 is connected to a head IC (head amplifier circuit) 117. The head IC 117 includes a read amplifier for amplifying a read signal read by the head 112, and a write amplifier for converting write data into a write current. The head IC 117 is connected to a read/write IC (read/write channel) 118. The read/write IC 118 is a signal processing device for performing various signal processes, such as analog-to-digital conversion of a read signal, encoding of write data, decoding read data, etc. The read/write IC 118 is connected to a hard disk controller (HDC) 119.

The HDC 119 has a disk control function for controlling data transfer from and to the disk 111. The HDC 119 includes an ATA interface. That is, the HDC 119 has an ATA interface control function for receiving and transmitting commands (such as read/write commands) and data from and to the host 20 via an ATA bus 120. However, in the embodiment that includes the HDD 10 having a SATA interface, the HDC 119 is connected to the SATA bridge 100 via the ATA bus 120, which differs from conventional HDDs. The HDC 119 is connected to the host 20 via the SATA bridge 100 and SATA bus 30.

Figure 2:
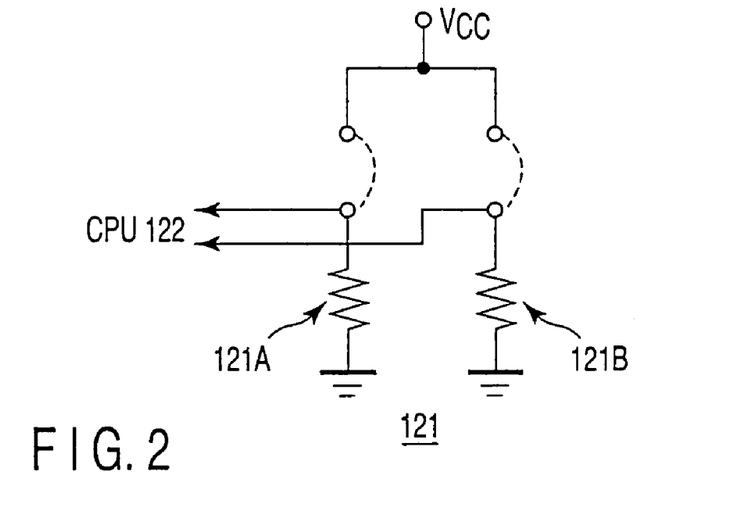
FIG. 2 is a circuit diagram illustrating the jumper unit 121 appearing in FIG. 1.
Figure 3:
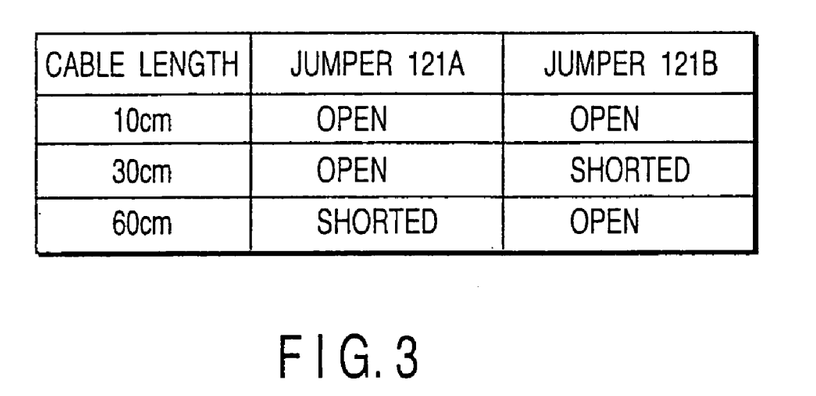
FIG. 3 is a table illustrating combinations of the states of the jumpers 121A and 121B appearing in FIG. 2, and the relationship between each state and a cable length.

The HDD 10 further comprises a jumper unit 121. The jumper unit 121 is used as a cable length designation unit (cable length designation means) for designating the cable length of the SATA bus 30. The jumper unit 121 includes at least one jumper. FIG. 2 shows a configuration example of the jumper unit 121. In the example of FIG. 2, the jumper unit 121 includes two jumpers 121A and 121B. FIG. 3 shows the relationship between each combination of the states (open or shorted) of the jumpers 121A and 121B and the cable length designated by each combination. In the examples of FIG. 3, if both jumpers 121A and 121B assume an open state, the cable length is 10 cm, if the jumpers 121A and 121B assume open and shorted states, respectively, the cable length is 30 cm, and if the jumpers 121A and 121B assume shorted and open states, respectively, the cable length is 60 cm. Further, no definition is given to the case where both jumpers 121A and 121B assume a shorted state. As is apparent, a larger number of jumpers may be employed and the larger the number of jumpers the jumper unit 121 includes, the larger number of cable lengths users can designate. Further, a DIP switch may be used as the cable length designation unit, instead of the jumper unit 121. The DIP switches may designate as many values of gain as desired such as 8 values or 16 values.

Figure 4:
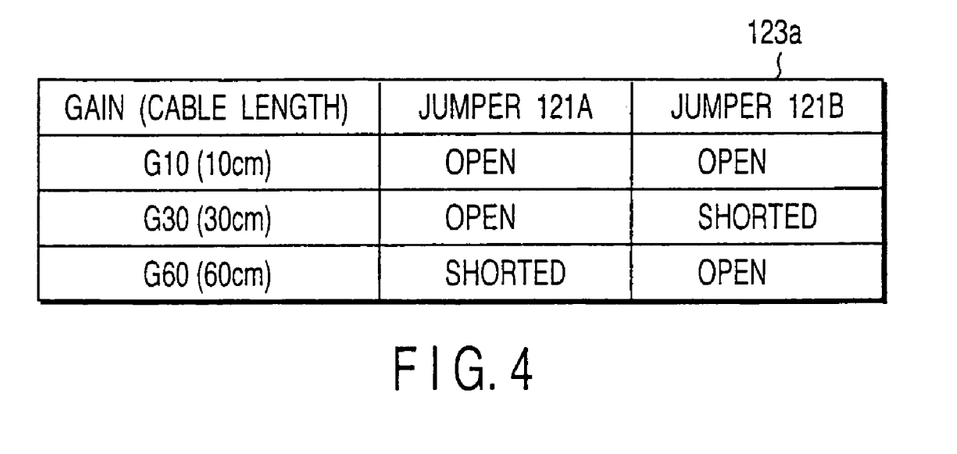
FIG. 4 is a table illustrating a data structure example of the gain table 123a appearing in FIG. 1.

The CPU 122 is a main controller in the HDD 10. The CPU 122 includes a nonvolatile memory prestoring a control program, such as a flash ROM (FROM) 123. The FROM 123 is programmable nonvolatile memory. The CPU 122 controls each element in the HDD 10 in accordance with the control program prestored in the FROM 123. Upon activation of the HDD 10, the CPU 122 reads the state of the jumper unit 121. The CPU 122 determines the gain of the output amplifier 101a from the cable length designated by the state of the jumper unit 121. The CPU 122 sets the determined gain value in the register 103. To determine the gain value, the CPU 122 refers to a gain table 123a stored in the FROM 123. The gain table 123a stores gain values for the output amplifier 101a in relation to the states the jumper unit 121 can assume. FIG. 4 shows a data structure example of the gain table 123a in which the gain values are G10, G30 and G60 corresponding to cable lengths of 10, 30 and 60 respectively.

As described above, each state of the jumper unit 121 designates the corresponding cable length of the SATA bus 30. The signal attenuation factor of the SATA bus 30 depends upon the cable length of the SATA bus 30. Accordingly, determination of the gain of the output amplifier 101a in accordance with a cable length designated by a state that the jumper unit 121 can assume means the determination of a gain in light of the signal attenuation factor of the SATA bus 30. The gain (amplitude parameter value) of the output amplifier 101a determines a signal amplitude at the transmit side. Therefore, in the embodiment, the gain of the output amplifier 101a is set to an optimal value (e.g., G10, G30 or G60) that is determined in light of the signal attenuation factor of the SATA bus 30 and that enables the signal amplitude at a receive side to meet the SATA interface standards. The reason why the gain of the output amplifier 101a is determined in light of the attenuation factor determined by the cable length will be described below.

Figure 5:
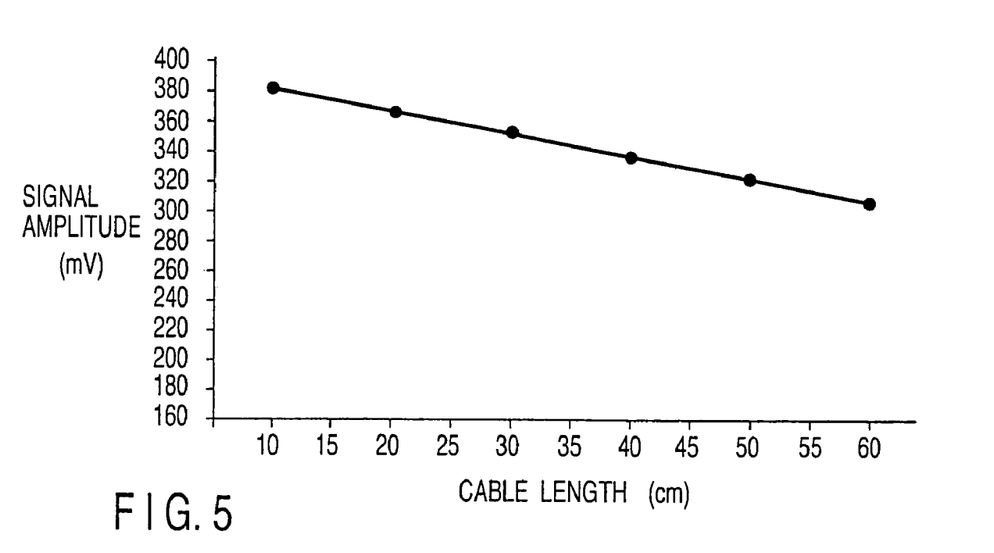
FIG. 5 is a graph illustrating the relationship between the amplitude of a data signal received at a receive side and the cable length of a SATA bus 30, if the amplitude of the data signal is 400 mV when it is output from a transmit side.

FIG. 5 illustrates changes at a receive side in the amplitude of a serial data signal due to changes in cable length. In the case of FIG. 5, it is assumed that the serial data signal has been output with an amplitude (peak-to-peak amplitude) of, for example, 400 mV, from the output amplifier 101a. As is evident from FIG. 5, even if the amplitude (output signal amplitude) of a serial data signal output from a transmit side is constant, the amplitude (input signal amplitude) of the signal varies depending upon the cable length when it is input to a receive side. The longer the cable length of the SATA bus 30, the higher the signal amplitude attenuation factor. In the example of FIG. 5, when the cable length is 10 cm, the signal amplitude at the receive side is about 380 mV. This amplitude is lower by about 5% than the amplitude (400 mV) at the transmit side. When the cable length is 30 cm, the signal amplitude at the receive side is about 360 mV, which is further lower than the amplitude (400 mV) at the transmit side. That is, the attenuation factor is about 10%. In the case of a cable length of 60 cm, the signal amplitude at the receive side is about 320 mV, which means an attenuation of about 20%. Therefore, unless the signal amplitude at the transmit side is appropriately set in accordance with the cable length of the SATA bus 30, the signal amplitude at the receive side may fall outside the standard range, resulting in reception of incorrect data. To avoid this, a gain table 123a having the data structure as shown in FIG. 4 is prepared so that the gain of the output amplifier 101a is determined in light of differences in attenuation factor due to differences in cable length.

Referring again to FIG. 1, the host 20 comprises a main host unit 21, SATA bridge 22 and jumper unit 23. The main host unit 21 corresponds to a conventional host that performs parallel data transfer using an ATA interface. The SATA bridge 22 and jumper unit 23 have the same structures as the SATA bridge 100 and jumper unit 121 included in the HDD 10. The SATA bridge 22 includes an output amplifier 221 and register 223 corresponding to the output amplifier 101a and register 103 of the SATA bridge 100. The main host unit 21 includes, for example, a flash ROM (FROM) 210 as a programmable nonvolatile memory. The FROM 210 stores a gain table 210a that corresponds to the gain table 123a incorporated in the CPU 122 of the HDD 10. In the embodiment, the contents of the gain table 210a are the same as those of the gain table 123a shown in FIG. 4. Upon activation of the host 20, the main host unit 21 reads the state of the jumper unit 23. The main host unit 21 acquires, from the gain table 210a, the gain of the output amplifier 221 determined from the cable length designated by the state of the jumper unit 23 (e.g., G10, G30 or G60). The main host unit 21 sets the acquired gain value in the register 203. The main host unit 21 and SATA bridge 22 are connected by an ATA bus 24. The ATA bus 24 corresponds to the ATA bus 120 of the HDD 10. Instead of the ATA bus 24 or 120, a peripheral component interconnect (PCI) bus, for example, which conforms to the ATA bus, may be used. In this case, the SATA interface control circuit realized by the SATA bridge 22 or 100 can be provided in a PCI bridge.

Figure 6:
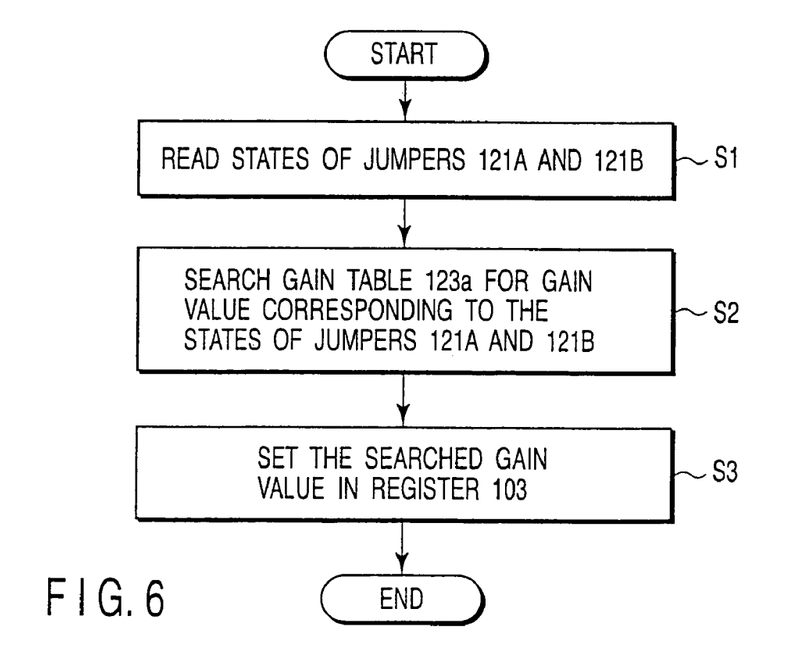
FIG. 6 is a flowchart useful in explaining a procedure employed in the embodiment for setting, in a register 103, a gain determined from a cable length indicated by the state of the jumper unit 121.

Referring now to the flowchart of FIG. 6, the operation of the HDD 10 during activation will be described. Firstly, assume that the HDD 10 is used as storage for the host 20 (in this case, a personal computer). Different computer manufacturers may choose to arrange their host SATA bridge 22 at different distances from their HDD units 10 depending on the particular geometry and layout of the PC adopted by each individual computer manufacturer or assembler. Thus the SATA cable 30 will have different lengths depending on the layout chosen by the manufacturer. In this case, a user (the manufacturer of the computer) operates the jumper unit 121, which serves as a cable length designation device, to designate the cable length of the SATA bus 30 that is used to connect the HDD 10 to the host 20. When the cable length of the SATA bus 30 is as short as 10 cm, both the jumpers 121A and 121B of the jumper unit 121 should be set to an open state, thus resulting in the gain of G10 being selected. When the cable length of the SATA bus 30 is as long as 60 cm, the jumpers 121A and 121B of the jumper unit 121 should be set to a shorted state and open state, respectively, thus resulting in the gain of G60 being selected.

During the activation of the HDD 10, the CPU 122 of the HDD 10 reads the states of the jumpers 121A and 121B of the jumper unit 21 (step S1), and refers to the gain table 123a to select the gain value corresponding to the read states of the jumpers 121A and 121B (step S2). Thus, the CPU 122 in cooperation with the gain table 123a, serves as an amplitude parameter generation device. The gain table 123a serves as an amplitude parameter storage device, and the CPU 122 serves as an amplitude parameter selection device since it selects that appropriate amplitude from the gain table 123a. When the gain table 123a has the data structure as shown in FIG. 4, if the jumpers 121A and 121B are in the shorted and open states, respectively, the CPU 122 selects G60 as the optimal gain of the output amplifier 101a in light of the signal attenuation factor assumed when the cable length of the SATA bus 30 is 60 cm. This is equivalent to the generation, by the CPU 122, of the optimal gain value corresponding to the cable length designated by the states of the jumpers 121A and 121B, as the amplitude parameter value for determining the amplitude of a serial data signal output from the output amplifier 101a. The CPU 122 sets the selected gain value in the register 103 of the SATA bridge 100 (step S3).

Assume that in this state, the head 112 has read a data signal recorded in the disk 111. The signal (read signal) read by the head 112 is amplified by the head IC 117. The read signal amplified by the head IC 117 is converted into digital data by the read/write IC 118. The data is sent to the ATA bus 120, where it is transferred by parallel transfer from the HDC 119 to the host 20. The data sent from the HDC 119 to the ATA bus 120 is converted by the link/transport layer processing unit 102 into a serial data signal conformable to the SATA interface standards. The resultant serial data signal is sent to the physical layer processing unit 101. The output amplifier 101a in the physical layer processing unit 101 amplifies the serial data signal with the gain designated by the gain value set in the register 103, and outputs the signal to the SATA bus 30.

The serial data signal output from the output amplifier 101a to the SATA bus 30 is transferred to the host 20 via the SATA bus 30. The serial data signal output to the SATA bus 30 is attenuated by the SATA bus 30 before it reaches the receive side (the input terminal of the host 20). The attenuation factor varies if the cable length of the SATA bus 30 is varied, as is shown in FIG. 5. Therefore, unless the amplitude of a signal output from the transmit side is set to an appropriate value according to the cable length of the SATA bus 30, the amplitude of the signal may fall outside the standard range when it is received at the receive side. In this case, the signal is not correctly received. In the embodiment, however, the gain of the output amplifier 101a is set, through the register 103, to an optimal value that enables the signal amplitude at the receive side to fall within the standard range, in accordance with the cable length of the SATA bus 30 corresponding to the state of the jumper unit 121 designated by a user. Accordingly, even if the serial data signal is attenuated by the SATA bus 30 before it reaches the input terminal of the host 20, the signal amplitude at the input terminal of the host 20 can be made to fall within the standard range.

Similarly, the user operates the jumper unit 23 provided in the host 20 to make it designate the cable length of the SATA bus 30. During activation of the host 20, the main host unit 21 selects, from the gain table 210a, the gain value corresponding to the cable length designated by the state of the jumper unit 23. The main host unit 21 sets the selected gain value in the register 223. As a result, also in the host 20, the gain of the output amplifier 221 can be set to an optimal value determined from the set cable length.

[Modification]

Referring again to FIG. 1 for facilitating the explanation, a modification of the embodiment will be described. In the modification, when a user designates the cable length of the SATA bus 30, they do not always have to use the jumper units 121 and 23. For example, they can also designate the cable length by operating input means (such as a keyboard or mouse). The user (e.g., manufacturer of the PC) may use the mouse to select among a drop down list of preset cable lengths or may use the keyboard to input any numerical value of cable length. In the latter case, the gain value may be obtained from interpolating between the points of FIG. 5 closest to the entered values, or if FIG. 5 is represented by a formula (as for example a straight line), the gain value may be calculated using the formula stored in the FROM 210 with the entered length values as inputs. In the modification, it is sufficient if the gain value corresponding to the designated cable length is set in the registers 223 and 103 of the SATA bridges 22 and 100. To this end, the main host unit 21 executes the commands for setting, in the registers 223 and 103 of the SATA bridges 22 and 100, the gain value corresponding to the cable length designated by the user.

Figure 7:
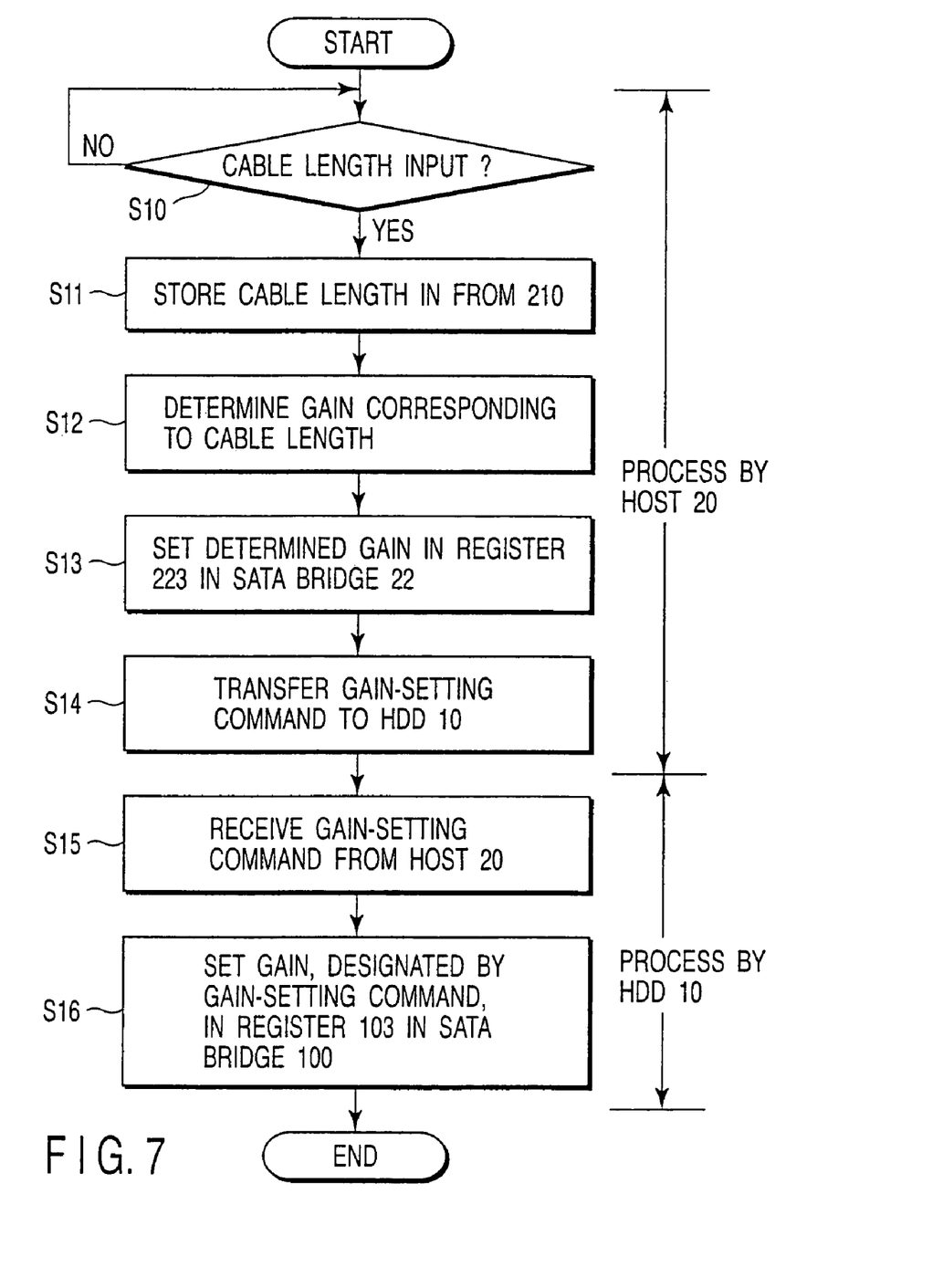
FIG. 7 is a flowchart useful in explaining a procedure, according to a modification of the embodiment, for setting a gain by a main host unit 21.

Referring to the flowchart of FIG. 7, the gain setting process by the main host unit 21 will be descried. Assume here that the host 20 is in a cable length input mode designated by a user, and then a cable length is input by the user. In the cable length input mode, the main host unit 20 may display a cable length selection dialog box to enable the user to select a desired cable length therefrom. When a cable length is input (selected) in the cable length input mode (step S10), the main host unit 21 stores the information indicating the input cable length, i.e., the information indicating the cable length designated by the user, in, for example, a cable length storing area pre-secured in the FROM 210 (step S11). In this modification of the embodiment the standard cable length information is stored in the cable length storing area of the FROM 210 when the host 20 is shipped. The information stored in the cable length storing area was updated at the step S11 to the newest one designated by the user.

Subsequently, the main host unit 21 determines the gain value corresponding to the cable length indicated by the newest cable length information stored in the FROM 210, referring to the gain table 210a stored in the FROM 210 (step S12). The main host unit 21 then executes a first gain-setting command for setting the determined gain value in the register 223 of the SATA bridge 22 (step S13). As a result, the gain of the output amplifier 221 in the SATA bridge 22 is adjusted to the value set in the register 223. In this state, the main host unit 21 sends a second gain-setting command (a particular command) to the ATA bus 24 to transfer it to the HDD 10 (step S14). The second gain-setting command is used for instructing the HDD 10 to set the gain value determined at the step S12 in the register 103 of the SATA bridge 100. The second gain-setting command includes the gain value determined at the step S12.

The second gain-setting command output from the main host unit 21 to the ATA bus 24 is transferred to the SATA bridge 22. The SATA bridge 22 converts the second gain-setting command into a serial data signal (serial command signal) conformable to the SATA interface standards. The second gain-setting command as the serial data signal is amplified by the output amplifier 221 with the gain set in the register 223, and output to the SATA bus 30. The gain set in the register 223 matches the cable length of the SATA bus 30.

The second gain-setting command sent from the output amplifier 221 to the SATA bus 30 is transferred by serial transfer to the SATA bridge lob of the HDD 10. The SATA bridge 100 receives the second gain-setting command transferred by serial transfer via the SATA bus 30. It is expected that the amplitude of the received second gain-setting command (i.e., the received serial data signal) falls within the SATA interface standard range. This is because the second gain-setting command sent from the output amplifier 221 of the SATA bridge 22 at the transmit side (host 20) to the SATA bus 30 is obtained by amplification made with the gain that matches the cable length of the SATA bus 30. The SATA bridge 100 converts the received second gain-setting command into a serial data signal (serial command signal) conformable to the SATA interface standards. The second gain-setting command as the serial data signal is received by the CPU 122 via the ATA bus 120 and HDC 119 (step S15). In accordance with the second gain-setting command transferred from the host 20, the CPU 122 sets the gain value, included in the command, in the register 103 of the SATA bridge 100 (step S16).

In the above modification, the newest cable length information designated by a user can be stored in the FROM 210 of the main host unit 21 of the host 20. Accordingly, the above-mentioned steps S12 to S16 can also be executed during the activation of the host 20, assuming the correct cable length has been previously input by the user in a previous start-up or activation operation. In other words, during the activation of the host 20, the second gain-setting command can also be transferred to the HDD 10 after the gain value corresponding to the cable length indicated by the newest cable length information is set in the register 223. This procedure can be executed even in the case shown in FIG. 1 where the host 20 has the jumper unit 23. Specifically, during the activation of the host 20, the second gain-setting command can also be transferred to the HDD 10 after the main host unit 21 sets, in the register 223, the gain value corresponding to the state of the jumper unit 23. In this case, there is no need for providing the jumper unit 121 in the HDD 10.

The above-described embodiment is directed to a system equipped with an HDD (magnetic disk drive). However, the present invention is also applicable to a system equipped with another type of disk drive, such as an optical disk drive, magneto-optical disk drive, etc. It is sufficient if the disk drive has a SATA interface. The present invention is further applicable to a system equipped with an electronic device other than disk drives, if only the electronic device has a SATA interface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device with a serial ATA interface, comprising:
   a signal output device outputting a serial data signal to a serial ATA bus which connects the electronic device to another electronic device, said another electronic device including another serial ATA interface;
   a cable length designation device for designating a cable length of the serial ATA bus in accordance with a user operation;
   an amplitude parameter generation device for generating, in accordance with the cable length designated by the cable length designation device, an amplitude parameter for determining an amplitude of the serial data signal when the signal output device outputs the serial data signal, the amplitude determined by the amplitude parameter enabling the amplitude of the serial data signal to fall within a range, stipulated in serial ATA interface standards, when said another electronic device receives the serial data signal; and
   a signal amplitude adjusting device for adjusting the serial data signal to the amplitude determined by the amplitude parameter, when the signal output device outputs the serial data signal.

2. The electronic device according to claim 1, wherein the amplitude parameter generation device includes:
   an amplitude parameter storage device for storing amplitude parameters in relation to respective cable lengths, each of the amplitude parameters determining an amplitude of the serial data signal when the signal output device outputs the serial data signal, the amplitude determined by each of the amplitude parameters enabling the amplitude of the serial data signal to fall within the range, stipulated in the serial ATA interface standards, when said another electronic device receives the serial data signal; and
   a selection device for selecting, from the amplitude parameter storage device, the amplitude parameter corresponding to the cable length designated by the cable length designation device.

3. The electronic device according to claim 1, wherein the cable length designation device includes a jumper unit.

4. The electronic device according to claim 1, wherein the signal amplitude adjusting device includes a register which holds the amplitude parameter generated by the amplitude parameter generation device.

5. The electronic device according to claim 4, further comprising a bridge device including the signal output device and the register, the bridge device connecting a parallel interface bus to the serial ATA bus, the bridge device performing interface conversion between an interface corresponding to the parallel interface bus and a serial ATA interface corresponding to the serial ATA bus, the parallel interface bus being a parallel ATA bus or a bus conformable to the parallel ATA bus.

6. The electronic device according to claim 1, wherein the signal output device includes a variable-gain output amplifier.

7. The electronic device according to claim 6, wherein:
   the amplitude parameter generated by the amplitude parameter generation device indicates a gain of the output amplifier; and
   the signal amplitude adjusting device sets the gain of the output amplifier as the amplitude parameter generated by the amplitude parameter generation device.

8. The electronic device according to claim 7, wherein the signal amplitude adjusting device includes a register for holding the amplitude parameter generated by the amplitude parameter generation device.

9. The electronic device according to claim 1, wherein:
the electronic device is a disk drive; and
said another electronic device is a host device which utilizes the disk drive as a storage device.

10. A system comprising:
a first electronic device with a serial ATA interface;
a second electronic device with a serial ATA interface; and
a serial ATA bus connecting the first electronic device to the second electronic device, the first electronic device including:
  a first signal output unit for outputting a first serial data signal to the serial ATA bus; and
  a first signal amplitude adjusting device for adjusting the first signal output unit to make the first serial data signal have an amplitude determined by a received amplitude parameter when the first signal output unit outputs the first serial data signal, the second electronic device including:
  a second signal output unit for outputting a second serial data signal to the serial ATA bus;
  a cable length designation device for designating a cable length of the serial ATA bus in accordance with a user operation;
  an amplitude parameter generation device for generating, in accordance with the cable length designated by the cable length designation device, an amplitude parameter for determining an amplitude of the second serial data signal when the second signal output unit outputs the second serial data signal, the amplitude determined by the amplitude parameter enabling the amplitude of the second serial data signal to fall within a range, stipulated in serial ATA interface standards, when the first electronic device receives the second serial data signal output from the second signal output unit;
  a second signal amplitude adjusting device for adjusting the second signal output unit to make the second serial data signal have an amplitude determined by the amplitude parameter when the second signal output unit outputs the second serial data signal; and
  said second signal output unit transferring a particular command to the first electronic device via the serial ATA bus, the particular command including the amplitude parameter generated by the amplitude parameter generation device, the particular command being used to supply the amplitude parameter included therein to the first signal amplitude adjusting device of the first electronic device as the received amplitude parameter.

11. The system according to claim 10, wherein the amplitude parameter generation device includes:
an amplitude parameter storage device for storing amplitude parameters in relation to respective cable lengths, each of the amplitude parameters determining an amplitude of the second serial data signal when the second signal output unit outputs the second serial data signal to the serial ATA bus, the amplitude determined by each of the amplitude parameters enabling the amplitude of the second serial data signal to fall within the range, stipulated in the serial ATA interface standards, when the first electronic device receives the second serial data signal output from the second signal output unit to the serial ATA bus; and
a selection device for selecting, from the amplitude parameter storage device, the amplitude parameter corresponding to the cable length designated by the cable length designation device.

12. The system according to claim 10, wherein the cable length designation device includes a jumper unit.

13. The system according to claim 10, wherein:
the first signal amplitude adjusting device includes a first output level adjusting register which holds the received amplitude parameter included in the particular command; and the cable length designation device includes a jumper unit.

14. The system according to claim 13, wherein said jumper unit provides at least three choices of said cable length.

15. The system according to claim 10, wherein:
the first electronic device is a disk drive; and
the second electronic device is a host device which utilizes the disk drive as a storage device.

16. The system according to claim 10, wherein said cable length designating device comprises a keyboard.

17. The system according to claim 10, wherein said cable length designating device comprises a mouse.

18. The system according to claim 10, further comprising a first bridge device comprising the first signal output device and a first register for storing said received amplitude parameter, the bridge device connecting the serial ATA bus to a parallel interface bus, the bridge device performing interface conversion between an interface corresponding to the parallel interface bus and a serial ATA interface corresponding to the serial ATA bus, the parallel interface bus being a parallel ATA bus or a bus conformable to the parallel ATA bus.

19. The system according to claim 18, wherein:
the first electronic device is a disk drive; and
the second electronic device is a host device which utilizes the disk drive as a storage device.

20. A method of adjusting an amplitude of a serial data signal, employed in a system in which a first electronic device with a serial ATA interface is connected to a second electronic device with a serial ATA interface by a serial ATA bus, the first electronic device including an signal output device for outputting a serial data signal to the serial ATA bus, and a signal amplitude adjusting device for adjusting an amplitude of the serial data signal in accordance with an amplitude parameter when the signal output device outputs the serial data signal, the method comprising:
generating, in accordance with a cable length designated by a user operation, an amplitude parameter for determining the amplitude of the serial data signal when the signal output device outputs the serial data signal, the amplitude determined by the amplitude parameter enabling the amplitude of the serial data signal to fall within a range, stipulated in serial ATA interface standards, when the second electronic device receives the serial data signal; and
setting the generated amplitude parameter in the signal amplitude adjusting device.

21. The method according to claim 20, wherein the generating includes selecting, from an amplitude parameter storage device, an amplitude parameter corresponding to the cable length designated by the user operation, the amplitude parameter storage device storing amplitude parameters in relation to respective cable lengths, each of the amplitude parameters determining an amplitude of the serial data signal when the signal output device outputs the serial data signal to the serial ATA bus, the amplitude determined by each of the amplitude parameters enabling the amplitude of the serial data signal to fall within a range, stipulated in serial ATA interface standards, when the second electronic device receives the serial data signal.

22. The method according to claim 20, further comprising reading a state of a jumper unit which designates the cable length, and wherein the generating includes generating an amplitude parameter corresponding to the cable length designated by the read state of the jumper unit.

23. A method of adjusting an amplitude of a serial data signal, employed in a system in which a first electronic device with a serial ATA interface is connected to a second electronic device with a serial ATA interface by a serial ATA bus, the first electronic device including a first signal output unit for outputting a first serial data signal to the serial ATA bus, and a first signal amplitude adjusting device for adjusting an amplitude of the first serial data signal in accordance with a received amplitude parameter when the first signal output unit outputs the first serial data signal, the second electronic device including a second signal output unit for outputting a second serial data signal to the serial ATA bus, and a second signal amplitude adjusting device for adjusting an amplitude of the second serial data signal in accordance with an amplitude parameter when the second signal output unit outputs the second serial data signal, the method comprising:

generating, in accordance with a cable length designated by a user operation, an amplitude parameter for determining the amplitude of the second serial data signal when the second signal output unit outputs the second serial data signal, the amplitude determined by the amplitude parameter enabling the amplitude of the second serial data signal to fall within a range, stipulated in serial ATA interface standards, when the first electronic device receives the second serial data signal;

setting the generated amplitude parameter in the second signal amplitude adjusting device;

causing the second signal output unit to transfer a particular command to the first electronic device via the serial ATA bus, the particular command including the generated amplitude parameter, the particular command being used to supply the amplitude parameter included therein as the received amplitude parameter to the first signal amplitude adjusting device of the first electronic device; and setting, in the first signal amplitude adjusting device, the received amplitude parameter included in the particular command, in accordance with the particular command transferred to the first electronic device.

24. An electronic device with a serial ATA interface, comprising:

a signal output device which includes a processing unit for converting serial data to parallel data and parallel data to serial data, said signal output device outputting a serial data signal to a serial ATA bus which connects the electronic device to another electronic device, said another electronic device including another serial ATA interface;

a cable length designation device for designating a parameter representative of a cable length of the serial ATA bus in accordance with a user operation; and a device, responsive to the designated parameter representative of cable length, for adjusting an amplitude of the serial data signal transmitted from the outputting device such that the amplitude of the serial data signal received by the another electronic device falls within a range, stipulated by a serial ATA interface standard.

25. An electronic device with a serial ATA interface, comprising:

a signal output device which includes a processing unit for converting serial data to parallel data and parallel data to serial data, said signal output device outputting a serial data signal to a serial ATA bus which connects the electronic device to another electronic device, said another electronic device including another serial ATA interface;

a cable length designation means for designating a parameter representative of a cable length of the serial ATA bus in accordance with a user operation; and means, responsive to the designated parameter representative of cable length, for adjusting an amplitude of the serial data signal transmitted from the outputting device such that the amplitude of the serial data signal received by the another electronic device falls within a range, stipulated by a serial ATA interface standard.

* * * * *